United States Patent [19]

Washizuka et al.

[11] Patent Number: 4,692,740

[45] Date of Patent: Sep. 8, 1987

[54] KEY INPUT DEVICE

[75] Inventors: Isamu Washizuka, Kyoto; Kiyoshi Kinugawa, Nara, both of Japan

[73] Assignee: Sharp Kabushiki Kaisha, Osaka, Japan

[21] Appl. No.: 581,799

[22] Filed: Feb. 21, 1984

[30] Foreign Application Priority Data

Feb. 21, 1983 [JP] Japan ............................ 58-24563[U]

[51] Int. Cl.⁴ ................................................ G06F 3/02

[52] U.S. Cl. ......................... 340/365 R; 340/365 VL

[58] Field of Search ........... 340/365 R, 365 S, 365 A, 340/365 E, 711, 712, 365 C; 235/145 R, 146; 364/189, 700, 705, 709

[56] References Cited

U.S. PATENT DOCUMENTS 3,940,758 2/1976 Margolin ......................... 340/365 R
3,971,925 7/1976 Wenninger et al. ......... 340/365 VL
4,086,655 4/1978 Tanimoto et al. .................. 340/705
4,120,039 10/1978 Fischer ................................ 364/709
4,122,526 10/1978 Dlugos et al. ...................... 364/705
4,330,776 5/1982 Dennison, Jr. et al. ........ 340/365 R
4,359,222 11/1982 Smith, III et al. .................. 340/711
4,523,297 6/1985 Ugon et al. .......................... 364/709

FOREIGN PATENT DOCUMENTS 0096334 6/1983 Japan ............................. 340/365 R

*Primary Examiner*—John W. Caldwell, Sr.
*Assistant Examiner*—Mahmoud Fatahi-yar
*Attorney, Agent, or Firm*—Birch, Stewart, Kolasch & Birch

[57] ABSTRACT

A key input device to be attached to an electronic apparatus includes a keyboard having a plurality of key switches, and an exchangeable connector that is connectable to a body of the electronic apparatus for enabling the keyboard to be selected so that information is inputted into the electronic apparatus by the keyboard.

8 Claims, 6 Drawing Figures

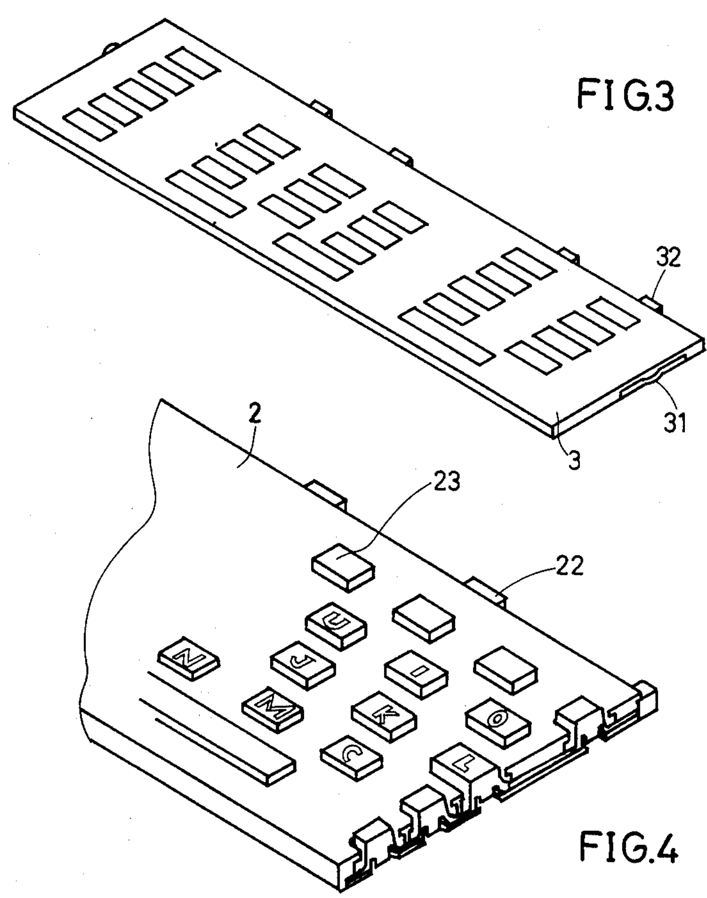
FIG.3
FIG.4
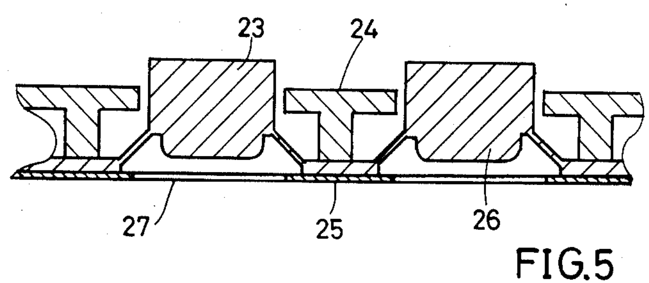
FIG.5

KEY INPUT DEVICE

BACKGROUND OF THE INVENTION

The present invention relates to an input device and, more particularly, to a key input device exchangeably connectable to a programmable electronic calculator.

A conventional programmable calculator can program any desired programs suitable for specific purposes. Since, conventionally, the same key input device is connected to the calculator, there are always switches on the dey input device that are not required for carrying out a desired operation. The keyboard input operation is somewhat difficult because the necessary key switches must be distinguished from the plurality of key switches that are not required.

Therefore, it is desired to provide an improved key input device suitable for a programmable calculator.

SUMMARY OF THE INVENTION

Accordingly, it is an object of the present invention to provide an improved key input device connectable to a programmable calculator.

It is another object of the present invention to provide an improved key input device exchangeably connectable to a programmable electronic calculator.

Briefly described, in accordance with the present invention, a key input device that is to be attached to an electronic apparatus comprises keyboard means including a plurality of key switches, and an exchangeable connector means that is connectable to a body of an electronic apparatus for enabling a keyboard means to be selected and provides that information can be inputted into the electronic apparatus by the selected keyboard means.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1, 2, 3, 4, and 6 show a perspective view of a key input device according to the present invention; and FIG. 5 is a sectional view of a keyboard used in the key input device.

DESCRIPTION OF THE INVENTION

Figure 1:
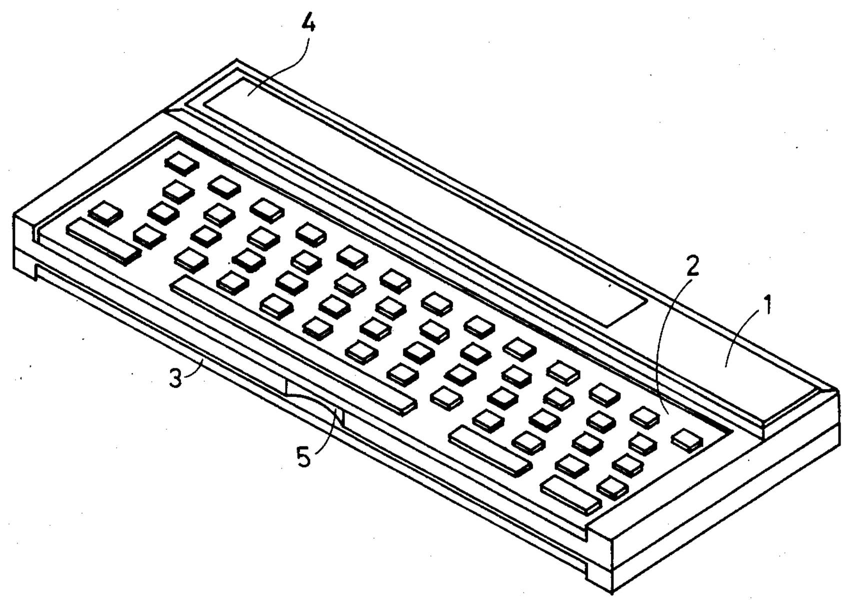

FIG. 1 shows a perspective view of an exchangeable key input device that is connectable to a programmable electronic calculator or a pocket computer according to the present invention.

Referring to FIG. 1, to a body 1 of the programmable electronic calculator, a first keyboard 2 and a second keyboard 3 are attached. A display 4 is provided in the body 1. The first keyboard 2 and the second keyboard 3 can be removed from the body 1. A concave grip 5 is provided on a plate carrying the first keyboard 2 and the second keyboard 3. The operator can remove either of the keyboards 2 and by fitting his finger into the concave grip 5. While the first keyboard 2 is mounted on the main surface of the calculator as shown in FIG. 1, some programs can be inputted by the first keyboard 2. While the second keyboard 3 is mounted on the rear surface of the calculator no program can be inputted by the second keyboard 3.

Figure 2:
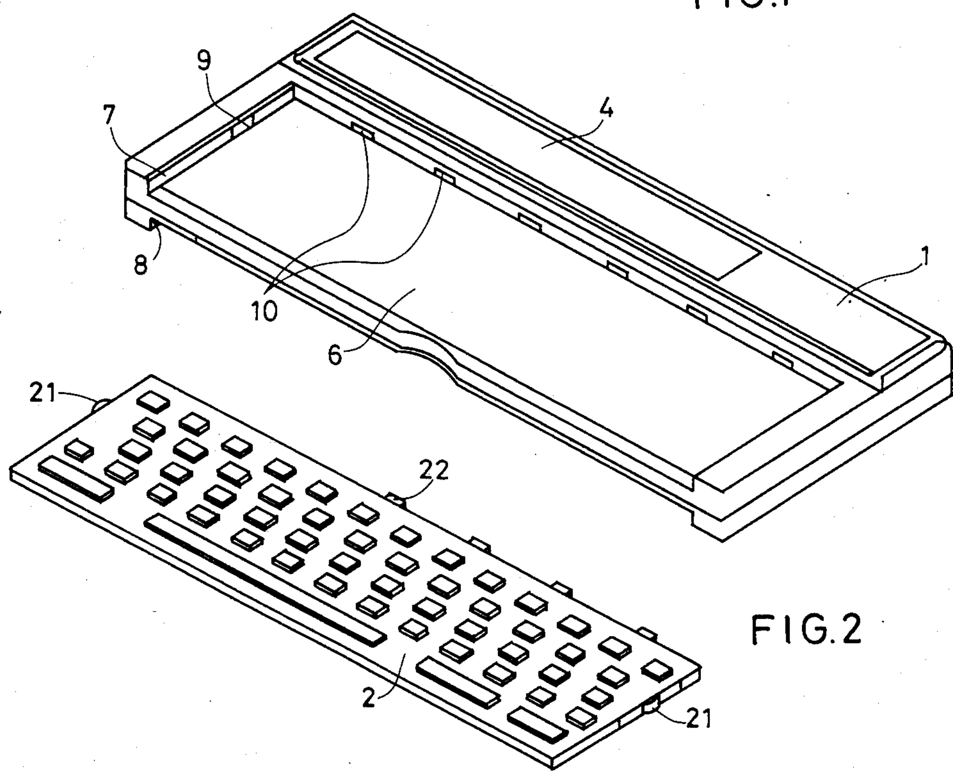

FIG. 2 shows a perspective view of this calculator in which both the first keyboard 2 and the second keyboard 3 are removed from the body 1. Referring to FIG. 2, a film key unit 6 is provided as will be described below. A storing guide 7 is provided for guiding the insertion of the selected first keyboard 2 which is to be operated for programming. The other storing guide 8 is provided for guiding the insertion of the unselected second keyboard 3 which is not to be operated for programming. A lock 9 is provided for engaging with a lock projection 21 in the side of the keyboard 2 to fix the keyboard into place. That is, keyboards are inserted into the calculator by sliding each of them into the body 1 through the guides 7 while keyboards are inserted into the calculator body 1 through guides 8. One or more mode switches 10 are provided at the inner side of the body 1 while one or more mode selection projections 22 are disposed on the outer side of the keyboard 2. When one or more specific mode selection projections 22 are connected to the one or more mode switches 10 so that the one or more mode switches 10 are selected by pushing the switches with the selection projections 22 the calculator detects the kind of keyboard that is inserted and attached to the body 1 of the calculator.

FIG. 3 shows a perspective view of the second keyboard 3. The second keyboard 3 includes a lock projection 31 and one or more mode selection projections 32. The second keyboard 3 is characterized in that numerical key switches having large key tops and which may be frequently operated are gathered at the central portion of the keyboard. While no character keys are inputted, such as during a period for running one of the calculator programs operation, the second keyboard 3 cn be attached to the main surface of the body 1. If desired, the first keyboard 2 can be fixed to the rear surface of the body 1 so as to easily replace the second keyboard 3 with the first keyboard 2.

FIG. 4 is a perspective view of the first keyboard 2, showing the inner structure.

FIG. 5 is a sectional view of the first keyboard 2.

Referring to FIGS. 4 and 5, each of a plurality of key switches has a key top 23 composed of an elastmer. Each of key frames 24 is interposed between the respective key switches to support each key top 23 on a base 25. Each of press points 26 is moved downward to press each film key portion through each aperture 27.

Figure 6:
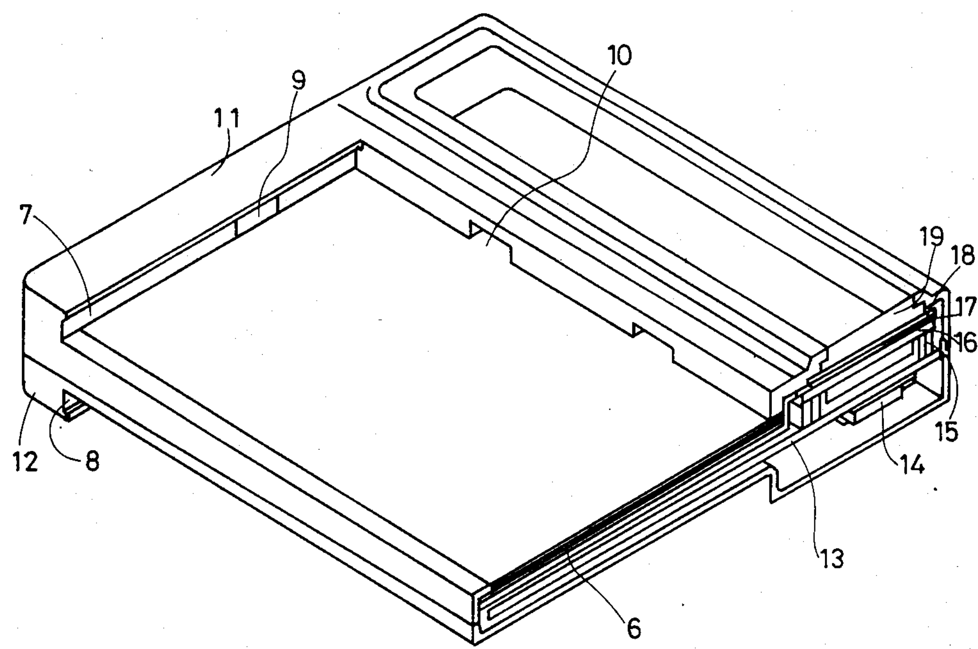

FIG. 6 shows a perspective view, partially broken away, of the body 1.

The body 1 comprises an upper cabinet 11, a lower cabinet 12, a film key unit 6, a circuit board 13, a circuit component 14 including an integrated circuit (IC), a rubber connector 15, a liquid crystal display 16, a polarizer 17, a display mask 18, and a filter 19 composed of an acrylic resin.

The film key unit 6 comprises two layers each carrying a plurality of key contacts printed in a matrix arrangement. The key contacts should be positioned under the key tops, but they are not positioned exactly under the respective key tops. If the distances between the respective key contacts are somewhat narrow, the number and the positions of the key contacts can be appropriately selected.

As described above, the number and type of mode selection projections is peculiar to the specific keyboard so as to identity the specific keyboard when coupled to the body of the electronic apparatus. It may be possible that the number and type of mode selection projections is common to the keyboards and that each of the keyboards includes a memory such as a read only memory (ROM) to identify the individual keyboards when coupled to the body. In such a case, the contents of the memory is read-out by the electronic apparatus to detect the specific keyboard connected to the calculator.

According to the present invention, any appropriate keyboard can exchangeably be attached to the electronic apparatus. In addition, the attachment of a specific keyboard to the electronic apparatus housing mode selection switches enables the electronic apparatus to be ready for the operation peculiar to the specific keyboard. Therefore, it may be possible that the programmer can operate a specific keyboard for programming, and then that specific keyboard can be replaced by another specific keyboard peculiar to running the program. In such a case, since the specific keyboard for the programming is no longer attached to the electronic apparatus erroneous erasure of the programmed data can be avoided.

While only certain embodiments of the present invention have been described, it will be apparent to those skilled in the art that various changes and modifications may be made therein without departing from the spirit and scope of the present invention as claimed.

What is claimed is:

1. A key input device for an electronic apparatus that has a body, comprising:

selectable keyboard means for producing key input signals, said selectable keyboard means including a plurality of key switches; and connector means for connecting said selectable keyboard means to the body of the electronic apparatus so that said key input signals can be input to the electronic apparatus, said connector means providing a non-fixed connection of said selectable keyboard means and the body of the electronic apparatus so that said selectable keyboard means and the body of the electronic apparatus are disconnectable without damage to said connector means, wherein said connector means comprises a plurality of lock projections provided on said selectable keyboard means and a plurality of locks provided on the body of the electronic apparatus for engaging said plurality of lock projections, and wherein said connector means further comprises at least one mode selection projection, attached to said selectable keyboard means, said selectable keyboard means being identified by the type of mode selection projection and number of mode selection projections, and a plurality of mode selection receptors attached to the body of the electronic apparatus, said mode selection receptors coupled to said at least one mode selection projection to connect and to indentify said selectable keyboard means to the body of the electronic apparatus.

2. The device of claim 1, wherein the electronic apparatus is an electronic programmable calculator.

3. The device of claim 1, wherein said mode selection receptor is disposed on a side of the body of the electronic apparatus and said mode selection projection is disposed on a side of said selectable keyboard means.

4. The device of claim 1, wherein said connector means further comprises a memory included within said selectable keyboard means interacting with the electronic apparatus upon connection of said selectable keyboard means and the body of the electronic apparatus for identifying said selectable keyboard means.

5. The device of claim 1 wherein the electronic apparatus is a pocket computer.

6. The device of claim 1 wherein there are provided a plurality of said selectable keyboard means with each of said selectable keyboard means capable of carrying out set functions when connected to the body of the electronic device.

7. The device of claim 6, wherein the body of the electronic apparatus comprises two surfaces to carry at least two of said plurality of selectable keyboard means.

8. The device of claim 6 wherein a first one of said plurality of selectable keyboard means is used for writing programs with the electronic apparatus and a second one of said plurality of selectable keyboard means is used for running said programs written with said first one of said plurality of selectable keyboard means.

* * * * *